United States Patent
Auclair et al.

(10) Patent No.: US 9,127,800 B2
(45) Date of Patent: Sep. 8, 2015

(54) DUCT FOR AIR-CONDITIONING CIRCUIT INCORPORATING A NOISE-REDUCING DEVICE, AND SUCH A CIRCUIT INCORPORATING IT

(71) Applicant: Hutchinson, Paris (FR)

(72) Inventors: Alexandre Auclair, Ferrieres en Gatinais (FR); Pierre Menou, Montargis (FR)

(73) Assignee: Hutchinson, Paris (FR)

( * ) Notice: Subject to any disclaimer, the term of this patent is extended or adjusted under 35 U.S.C. 154(b) by 342 days.

(21) Appl. No.: 13/855,887

(22) Filed: Apr. 3, 2013

(65) Prior Publication Data

US 2013/0255813 A1    Oct. 3, 2013

(30) Foreign Application Priority Data

Apr. 3, 2012  (FR) ...................... 12 53036

(51) Int. Cl.
*F25D 19/00*  (2006.01)
*F16L 55/033*  (2006.01)
*B60H 1/00*  (2006.01)

(52) U.S. Cl.
CPC .......... *F16L 55/033* (2013.01); *B60H 1/00571* (2013.01); *B60H 2001/006* (2013.01)

(58) Field of Classification Search
CPC ............. F25B 2500/12; F25B 2500/01; F25B 2500/17; F24F 13/24
USPC ...................... 62/239, 244, 296, 498; 138/44; 181/212, 232
See application file for complete search history.

(56) References Cited

U.S. PATENT DOCUMENTS

| | | | | |
|---|---|---|---|---|
| 5,791,141 | A  * | 8/1998 | Phillips | 60/327 |
| 6,158,472 | A  * | 12/2000 | Hilgert | 138/26 |
| 7,036,530 | B2 * | 5/2006 | Chen et al. | 138/30 |
| 7,325,570 | B1 | 2/2008 | Krieger | |
| 2002/0100515 | A1* | 8/2002 | Chen et al. | 138/30 |
| 2004/0250865 | A1* | 12/2004 | Davis | 138/26 |
| 2007/0281600 | A1* | 12/2007 | Thawani et al. | 454/148 |
| 2009/0215378 | A1* | 8/2009 | Terai et al. | 454/152 |

FOREIGN PATENT DOCUMENTS

| | | |
|---|---|---|
| EP | 1 864 838 A1 | 12/2007 |
| EP | 2 106 943 A1 | 10/2009 |
| WO | WO 2012/013874 A1 | 2/2012 |

OTHER PUBLICATIONS

Preliminary Search Report for French Application No. FR 1253036 dated Oct. 29, 2012.

* cited by examiner

*Primary Examiner* — Melvin Jones
(74) *Attorney, Agent, or Firm* — Alston & Bird LLP (57) ABSTRACT

A duct for fluid under pressure for an air-conditioning circuit having a conduit including a male end fitting of nominal inside diameter D0 and a female end fitting connected to it in a fluid-tight manner in or in the immediate vicinity of an enlarged axial portion of inside diameter D2 of the male or the female end fitting, the female end fitting having a nominal inside diameter D0', and a tubular noise-reducing device that is mounted inside the male end fitting and defines between an axially internal end and an axially external end of this device at least one fluid flow channel. The enlarged portion of the male or female end fitting has a length L2 such that L2≥0.6D, where D designates their common value if D0 and D0' are equal or whichever is the lower of the values D0 and D0' if they are not equal.

15 Claims, 6 Drawing Sheets

DUCT FOR AIR-CONDITIONING CIRCUIT INCORPORATING A NOISE-REDUCING DEVICE, AND SUCH A CIRCUIT INCORPORATING IT

FIELD

The present invention concerns a duct for fluid under pressure for an air-conditioning circuit of a motor vehicle or a building (i.e. industrial air-conditioning, for example), the duct comprising a conduit including a male end fitting that contains a noise-reducing device and a female end fitting connected in fluid-tight manner to the male end fitting, and such an air-conditioning circuit incorporating this duct.

BACKGROUND

As a general rule, a noise-reducing device for an air-conditioning circuit of a motor vehicle is formed of an acoustic capacity that is mounted in line in a duct of this circuit between a compressor and an evaporator, so as to attenuate the transmission of the sound waves generated primarily by the compressor and propagating in the cooling fluid inside the conduit, via a sudden enlargement of the cross section of the passage for the fluid entering this capacity. This enlargement of the flow cross section at the entry into the capacity results in a known manner in the creation of a sound wave with opposite phase adding to the disturbing wave to generate an attenuated wave of lower amplitude.

Such an acoustic capacity is usually situated at a location of the duct of the air-conditioning circuit that is relatively far from the compressor, essentially because of the volume that this capacity occupies and the room that is often lacking in the driving engine assembly of the motor vehicle comprising this compressor to install the capacity in the immediate vicinity of the latter and, in situations where such installation of the capacity in the immediate vicinity of the compressor would nevertheless be feasible, because of the undesirable mechanical vibrations that are generated by the presence of the additional mass formed by this capacity and which may cause the corresponding duct to rupture.

This relatively great distance of the acoustic capacity relative to the compressor notably has the effect of generating an area of resonance between these two components in which noise may be self-amplifying. As a result of this the attenuation of the noise in the duct of the air-conditioning circuit is still open to improvement.

These acoustic capacities thus enable some degree of attenuation of the noise generated by the compressor and propagating in the duct of the air-conditioning circuit. On the other hand, they simultaneously have the drawback of generating significant head losses for the fluid flowing through them because of the sudden modification of the flow cross section that characterizes them. Furthermore, they have a relatively high cost of manufacture and of installation on the duct of the air-conditioning circuit.

The document EP-A1-1 864 838 in the name of the Applicant describes in this context a cooling fluid conduit for such an air-conditioning circuit which makes it possible to remedy this drawback at the same time as achieving satisfactory acoustic attenuation in this circuit. This conduit is provided in its internal space with a noise-reducing device the radially external face of which espouses the wall of the conduit and which has entry and exit ends forming at least one axial flow channel of the fluid in the device.

The document EP-A1-2 106 943 also in the name of the Applicant describes a cooling fluid duct for such an air-conditioning circuit including a male end fitting that is intended to be connected in fluid-tight manner to a female end fitting and inside which there is mounted a globally tubular noise-reducing device defining between two ends of this device an axial flow channel for the fluid and with the male end fitting at least one annular dead volume that does not communicate with this channel at one of these two ends at least. This noise-reducing device also achieves satisfactory attenuation in this circuit.

SUMMARY

An aim of the present invention is to propose a new duct structure for fluids under pressure of gas or supercritical type of an air-conditioning circuit of a motor vehicle or of a building, of the type with a male end fitting incorporating a noise-reducing device that may be of the type described by way of nonlimiting example in the aforementioned documents EP-A1-1 864 838 and EP A1 2 106 943, which achieves satisfactory acoustical results without being linked to a particular geometry of the noise-reducing device, whilst having a low production cost and overall size, this duct comprising:

a conduit including a tubular male end fitting of nominal inside diameter D0 and a tubular female end fitting that is connected in fluid-tight manner to the male end fitting in an enlarged axial portion of the female end fitting or in the immediate vicinity of an enlarged axial portion of the male end fitting, this male or female end fitting enlarged portion having a maximum inside diameter D2 and the female end fitting having a nominal inside diameter D0' identical to D0 or not, and a globally tubular noise-reducing device that is mounted axially and radially inside the male end fitting and defines, between an axially internal end and an axially external end of this device relative to the male end fitting (here "internal" and "external" mean the ends of the device respectively facing axially toward the interior of the male end fitting away from the female end fitting and axially toward the exterior of this male end fitting toward the female end fitting) at least one fluid flow channel in the direction of the axis of the conduit, the external end of the device being mounted in fluid-tight manner against a terminal edge of the male end fitting in line with the female end fitting.

To this end, the duct of the invention is such that said enlarged portion of the male or female end fitting has, starting from said axially internal or external end of the device situated in line with this enlarged portion, a length L2 such that $L2 \geq 0.6D$, where in this product D designates the common value D0, D0' or the lower value D0 or D0' (i.e. $D=D0=D0'$ or $D=\min(D0; D0')$).

It will be noted that, given the minimum internal diameter D1 of the noise-reducing device that defines a relatively small flow cross section for the fluid and the ratio D2/D1 (greater than 1) between this device and the enlarged portion of the male or female end fitting, this abnormally high value used for this length L2 enables the impedance rupture value to be made of the same order of magnitude as that of an acoustic capacity and thus advantageously an improved acoustical efficiency to be obtained without modification of the nominal diameter D of the conduit or of the diameter D2 of the enlarged portion of the male or female end fitting.

With reference to an air-conditioning circuit specifically for a motor vehicle, said length L2 of said enlarged axial portion may preferably be such that $L2 \geq 10$ mm.

It should be noted that this length L2 for the enlarged male or female end fitting, which is therefore greater than the half-diameter 0.5D (or nominal radius of the conduit) is very large, notably compared to existing lengths L2 of the standard female end fittings used in these air-conditioning circuits, as measured between the terminal end of the male end fitting and the beginning of this enlarged portion, which are always very small, usually only between 0 mm and 1 mm. Such male or female end fittings have never until now been made in the industry with this "overlength" L2 of around ten millimetres for the enlarged portion, notably with contraindications for the industry of the increased manufacturing cost and time compared to these standard male or female end fittings caused by the use of additional tooling.

Said length L2 of this enlarged axial portion may even more advantageously be such that $1.5D \leq L2 \leq 2.4D$.

In this case, said length L2 of this enlarged axial portion may be such that $25\ mm \leq L2 \leq 40\ mm$, preferably for a motor vehicle air-conditioning circuit.

In accordance with a first embodiment of the invention, the female end fitting has a terminal connection area comprising said axial enlarged portion that has a globally cylindrical geometry of length greater than said length L2 for the fluid-tight mounting of a terminal section of this radially enlarged portion on an end section of the male end fitting via two annular flanges surrounding these sections and included in the duct, this enlarged portion being extended opposite the male end fitting via a convergent connecting portion by another globally cylindrical portion having said nominal inside diameter D0'.

In accordance with a second embodiment of the invention, the male end fitting has axially beyond the female end fitting said enlarged axial portion, which has a globally cylindrical geometry of length greater than said length L2, the female end fitting having a terminal connecting area mounted in a fluid-tight manner on an end section of the male end fitting situated short of this enlarged portion via an annular crimping member that surrounds this area and cooperates in abutment fashion with this end section in a fluid-tight manner, this enlarged portion being extended at its two ends by respective convergent portions of which that opposite the female end fitting defines said nominal inside diameter D0 and the other is extended by said end section.

In accordance with another feature of the invention, said axially external end of the noise-reducing device may include a radial flange mounted against an end enlargement of the male end fitting defining said terminal edge of the latter.

In accordance with one example of the invention, the noise-reducing device delimits with the male end fitting, axially between said axially internal end and said axially external end of the device, at least one annular dead volume that does not communicate with said channel via at least one of these two ends. The aforementioned document EP-A1-2 106 943 may be referred to for a detailed description of such an annular dead volume, which by definition does not contribute to the flowrate of cooling fluid circulating outside the conduit (i.e. in addition to the cooling fluid entering the conduit via the upstream end of the device and leaving it via its downstream end) and has the effect of restricting the flow cross section of the fluid in this conduit, which makes it possible to improve the acoustic attenuation at high frequencies.

In particular, and in accordance with this first example, said axially internal end of the device may also be mounted in a fluid-tight manner against the male end fitting so that said annular dead volume extends from said axially internal end to said axially external end and does not communicate with said channel (see FIG. 2 of the document EP-A1-2 106 943). In this case, this annular dead volume is designed not to receive the cooling fluid, but only to form the aforementioned restriction for the flow cross section of the fluid in the device.

Alternatively, said axially internal end may form with the male end fitting at least one continuous or discontinuous admission area for the fluid that is located radially between this axially internal end and the male end fitting and communicates with said annular dead volume (see FIGS. 3 and 4 of the same document). In this case, this annular dead volume is intended to receive the cooling fluid via the axially internal end of the device, but opposes its circulation outside the conduit because of the confinement of the fluid in this volume by the other, non-communicating axially external end of the device.

Also in accordance with this example defining said or each annular dead volume, this noise-reducing device may have its axially internal end converging toward a substantially cylindrical or prismatic intermediate section of the device connected to said axially external end by a divergent downstream section, as shown for example in this document EP A 1 2 106 943.

In accordance with another example of the invention, the noise-reducing device has an at least partly cylindrical external face that espouses the radial internal face of the male end fitting, as shown for example in the other aforementioned document EP A1 1 864 838.

It will nevertheless be noted that geometries other than those described in the above two documents can be used for the noise-reducing device of a duct according to the invention, what is essential being that this device be mounted in a fluid-tight manner against the terminal edge of the male end fitting in line with the female end fitting.

This device may advantageously be made entirely from a rigid material, such as a metal, in which case the thickness of its wall is of the order of 0.1 mm, or such as a plastic material, for example 6.6 polyamide, in which case the thickness of its wall is of the order of 1 mm.

It should be noted that this globally tubular device that is received in the male end fitting has a structure that enables it to be inserted at one end of the duct situated in the immediate vicinity of the compressor, so that the acoustic attenuation is improved by this, in contrast to the acoustic capacities of the prior art that are usually mounted at a distance from the compressor for the reasons set out hereinabove.

An air-conditioning circuit in accordance with the invention of a motor vehicle or a building is of the type including ducts intended to convey a cooling fluid in the gaseous state under pressure and at least one noise-reducing device inserted into at least one of these ducts, this duct including this device being as defined hereinabove with reference to the present invention.

In accordance with another advantageous feature of the invention specific to an air-conditioning circuit for motor vehicles, the or each duct in which said at least one device is inserted may be connected directly to the inlet and/or the outlet of said compressor, respectively in a low-pressure line and/or in a high-pressure line of said circuit, and said device may preferably be mounted at the end of this duct that opens onto said inlet and/or said outlet of the compressor, respectively in said low-pressure line and/or in said high-pressure line. In other words, it will be noted that this device is usable as much in a low-pressure line as in a high-pressure line of such an air-conditioning circuit.

It will again be noted that this mounting of the noise-reducing device in the immediate vicinity of the compressor enables even more satisfactory attenuation of the noise generated by the latter in the motor vehicle air-conditioning circuit.

The duct in which this device is inserted is even more preferably connected directly to the inlet of the compressor in a low-pressure line of this circuit.

The air-conditioning circuit in accordance with the invention may function in the usual ranges of temperature and pressure for the cooling fluid used, i.e. for a motor vehicle for example at pressures substantially from 2 bar to 25 bar in the case of "R134a" and from a few tens of bar to around 150 bar for carbon dioxide.

It will be noted that a cooling fluid such as carbon dioxide may be in the gas state at the inlet of the compressor in such a circuit whereas it may be in a supercritical state at the outlet of that compressor.

BRIEF DESCRIPTION OF THE DRAWINGS

Other features, advantages and details of the present invention will emerge from a reading of the following description of embodiments of the invention provided by way of nonlimiting illustration, said description being given with reference to the appended drawings, in which.

DETAILED DESCRIPTION

Figure 1:
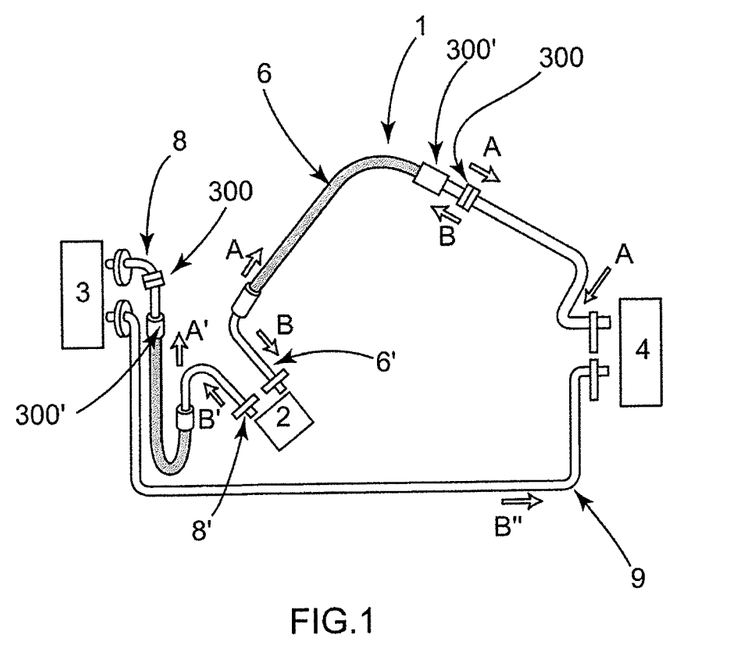
FIG. 1 is a diagrammatic perspective view of an air-conditioning circuit in accordance with the invention for motor vehicles, notably showing low-pressure and high-pressure lines for a cooling fluid in the gaseous or supercritical state with various examples of the position of a duct with a noise-reducing device in accordance with the invention.

The air-conditioning circuit 1 shown in FIG. 1 is in a known manner a closed circuit that comprises a plurality of elements distributed inside the engine compartment of the vehicle, notably a compressor 2, a condenser or cooler 3, a dehydrating reservoir (not visible), an expansion system (not visible) and an evaporator 4, and in which a cooling fluid in the gaseous or supercritical state (such as "R134a" or carbon dioxide, by way of nonlimiting example) or a fluid in the liquid state circulates under pressure. All these components are interconnected by rigid or flexible lines constituted of rigid and/or flexible tubular portions that have fluid-tight connecting means at each of their ends.

To be more precise, a circuit 1 in accordance with the invention includes:

a low-pressure line 6, 6' intended to convey the cooling fluid in the gaseous state between the compressor 2 and the evaporator 4 and a noise-reducing device 300 or 300' in accordance with the invention that is different from the known devices of acoustic capacity type and which may be mounted in-line in a conduit 6 or 6' (in this line 6, 6', the arrows A indicate the direction of propagation of the noise generated by the compressor 2 and the arrows B the direction of circulation of the fluid, which is the opposite of the previous direction);

a high-pressure line 8, 8' for the cooling fluid in the gaseous or supercritical state which is connected to the compressor 2 and to the condenser 3 and which may also incorporate in-line such a noise-reducing device 300 or 300' (in this line 8, 8', the arrow A' indicates the direction of propagation of the noise generated by the compressor 2 and the arrow B' the direction of circulation of the fluid, which is the same as the previous direction); and a high-pressure liquid line 9 which is connected to the condenser 3 and to the evaporator 4 (in this line 9, the arrow B" indicates the direction of circulation of said fluid in the liquid state).

It will be noted that the four locations shown in FIG. 1 for the ducts 300, 300' in accordance with the invention are merely diagrammatic examples that are nonlimiting by definition and that these ducts 300, 300' could be positioned elsewhere in the low-pressure line 6, 6' and/or in the high-pressure line 8, 8'.

In a known manner, the acoustic capacity used at present in the low-pressure line 6, 6' includes entry and exit openings for the cooling fluid and the enlargement of the flow cross section for the fluid that characterizes it enables attenuation of the sound waves generated by the compressor 2 and propagating along this line 6, 6'. On the other hand, this capacity has the known drawback of generating head losses when the fluid passes through it.

Figure 2:
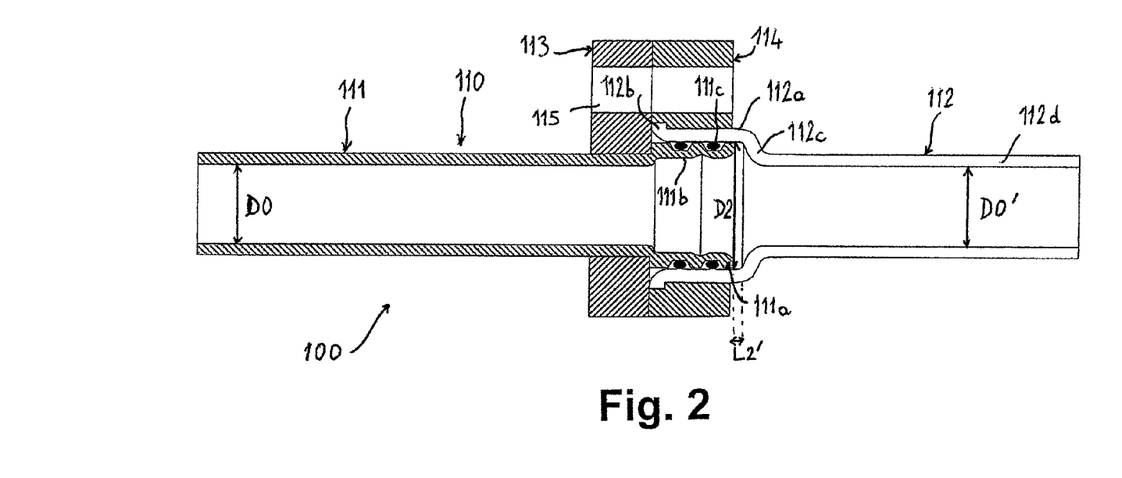
FIG. 2 is a view in longitudinal section of a prior art duct with male and female end fittings and no noise-reducing device used in an air-conditioning circuit for motor vehicles, for example.

The control duct 100 shown in FIG. 2 comprises a conduit 110 including a tubular male end fitting 111 with nominal inside diameter D0 and a tubular female end fitting 112 which is connected in fluid-tight manner to the male end fitting 111 by way of a cylindrical enlarged terminal axial portion 112a of the female end fitting 112 of maximum inside diameter D2.

To be more precise, the male end fitting 111 includes an end section 111b forming a small radial enlargement that terminates at a terminal edge 111a and is provided with seals 111c (two in number in this example, it being pointed out that a single seal 111c could be used instead) to receive in tight and fluid-tight contact the radial internal face of the enlarged portion 112a of the female end fitting 112.

As for this enlarged portion 112a of the female end fitting 112, it has in a known manner a small overall length such that its length L2' as measured axially between the terminal edge 111a and the beginning of this portion 112a is virtually zero, being at most equal to about 1 mm, for example. This enlarged portion 112a terminates conventionally in a short rim 112b extending it radially outwards and is the root of a substantially frustoconical enlargement 112c formed from a cylindrical base portion 112d of nominal inside diameter D0' (identical to D0 in this example, which gives the whole of the duct 100 a nominal inside diameter for the fluid D=D0=D0').

Finally, a male fixing flange 113 and a female fixing flange 114 for connecting the duct 100 to a unit of the air-conditioning circuit 1, such as the compressor 2, respectively surround in a known manner the male end fitting 111 just short of its end section 111b and the female end fitting 112 in its enlarged portion 112a around its rim 112b, so that these axially juxtaposed flanges 113 and 114 form of themselves a through-bore 115 receiving a connecting member.

Figure 3:
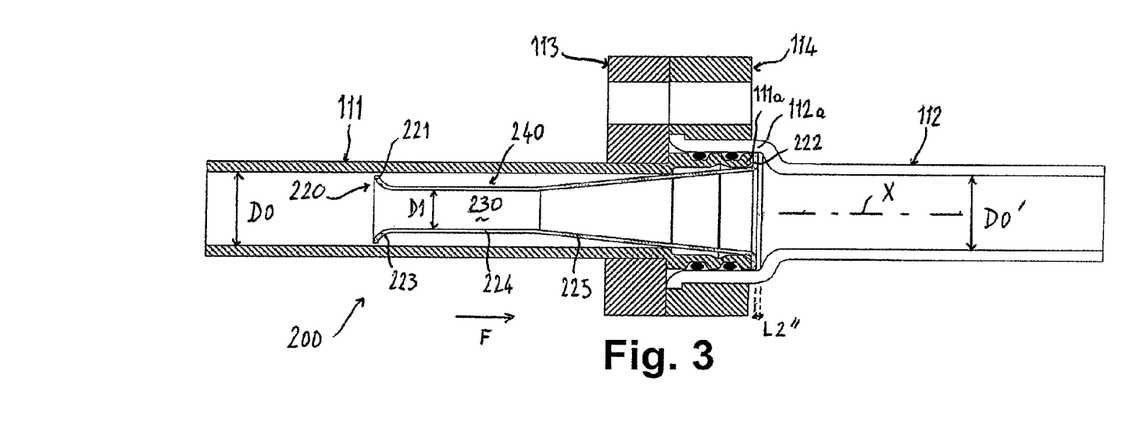
FIG. 3 is a view in longitudinal section of the duct from FIG. 2 with male and female end fittings but also with a noise-reducing device inserted into the male end fitting in accordance with the teaching of the aforementioned document EP-A1-2 106 943.

The duct 200 from FIG. 3 differs from that 100 from FIG. 2 only in that it further incorporates a globally tubular noise-reducing device 220 that is mounted axially and radially inside the male end fitting 111 and which defines between an axially internal end 221 and an axially external end 222 of this device 220 at least one cooling fluid flow channel 230 (see arrow F for the direction of flow of this fluid) in the direction of the axis X of the conduit, the external end 222 of the device 220 being mounted in fluid-tight manner against the terminal edge 111a of the male end fitting 111 and in line with the enlarged portion 112a of the female end fitting 112. This device 220 is identical to that shown in FIG. 3 of the aforementioned document EP A1 2 106 943 and in this embodiment has:

a convergent upstream section 223 in the form of a hyperboloid of revolution (i.e. with a concave radially external face) the internal (or upstream) end 221 of which of circular shape forms with the internal face of the wall of the male end fitting 111 an annular fluid admission space, a cylindrical intermediate section 224 arranged coaxially with the male end fitting 111, and a frustoconical downstream section 225 that diverges from the section 224 and terminates in a radial flange constituting the external end 222 that is mounted in fluid-tight manner against the terminal edge 111a of the male end fitting 111 and forms the downstream end of the device 220.

There is obtained in this way an annular dead volume 240 radially included between the device 220 and the cylindrical wall of the male end fitting 111 with the internal space of the latter situated on the upstream side of the end 221 of the device 220 that communicates with this dead volume 240.

It will be noted that the length L2" relative to the enlarged portion 112a, as measured in FIG. 3 axially between the external flange 222 and the start of this portion 112a is virtually zero, in the manner of the length L2' mentioned above with reference to FIG. 2.

The whole of the device 220 may be made entirely from a rigid material such as a metal or a rigid plastic material (e.g. a 6.6 polyamide) or, alternatively, from such a rigid material except for the intermediate section 224 that may advantageously be made from rubber with a Shore A hardness close to 60, or from TPV.

In the following description of FIG. 4, the reference numbers from FIGS. 2 and 3 have been retained where these reference numbers designate the same elements.

Figure 4:
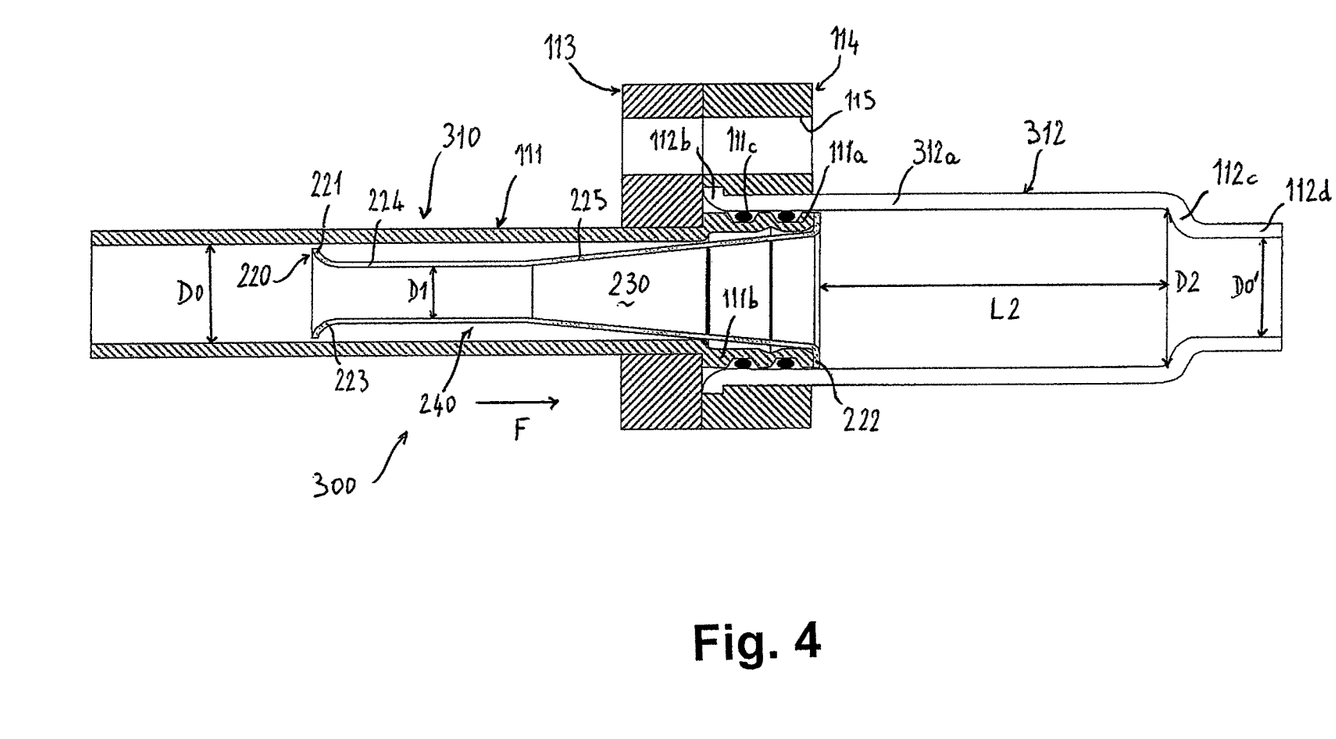
FIG. 4 is a view in longitudinal section of a duct in accordance with a first embodiment of the invention which differs from that from FIG. 3 only in the female end fitting used, the noise-reducing device being unchanged.

The duct 300 in accordance with the first embodiment of the invention shown in FIG. 4 (this figure is not drawn to scale) differs from that from FIG. 3 only in that the enlarged terminal portion 312a of its female end fitting 312 included in its conduit 310 has a total length much greater than that of the enlarged portion 112a of the prior art, so that its length L2 as measured from the external flange 222 of the device 220 is equal to or greater than 0.6 times the nominal inside diameter D of the duct 300, in this case where D=D0=D0' (or alternatively 0.6 times the smaller of the inside diameters D0 and D0'). As will be explained hereinafter, the Applicant has established that particularly advantageous results that have been verified in terms of acoustic efficacy are seen for a length L2 that is equal to or greater than 10 mm for standard diameters D (by way of nonlimiting example between 16 mm and 17 mm). It will be noted that the diameters D1 and D2 are unchanged for this duct 300 from FIG. 4 compared to FIG. 3.

Figure 5:
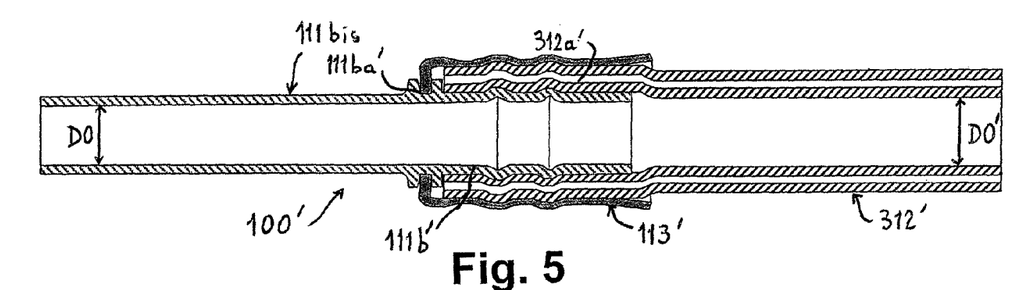
FIG. 5 is a view in longitudinal section of another prior art duct with male and female end fittings for air-conditioning circuits for motor vehicles, for example, with no noise-reducing device in the manner of FIG. 2.

The duct 100' shown in FIG. 5 has a male end fitting 111bis of nominal inside diameter D0 crimped in a fluid-tight manner to a female end fitting 312' of multilayer type in this embodiment with an intermediate reinforcing layer disposed between radially internal and external layers, for example (this end fitting 312' has a nominal inside diameter D0'). In the embodiment shown there is used for this purpose a crimping ring 113' that surrounds a terminal connection area 312a' of the female end fitting 312' (the area 312a' has a diameter slightly greater than D0') and is bent over at a right angle so as to be locked into a circumferential groove 111ba' of an end section 111b' of the male end fitting 111bis receiving this area 312a'.

Figure 6:
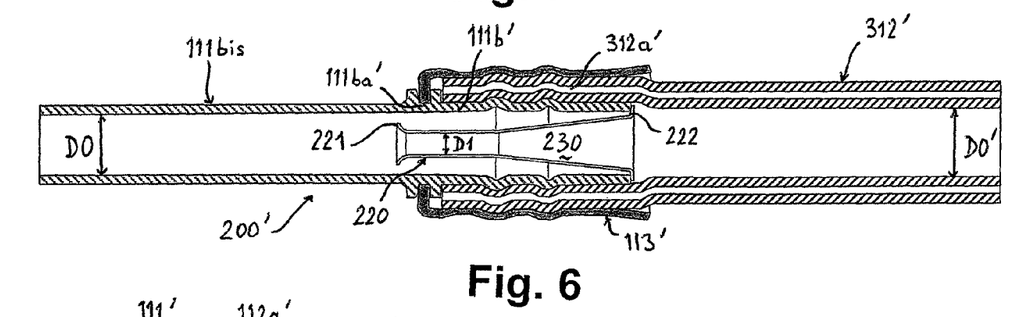
FIG. 6 is a view in longitudinal section of the duct from FIG. 5 but with additionally, in the manner of FIG. 3, the same noise-reducing device inserted in the male end fitting.

The duct 200' shown in FIG. 6 further incorporates a noise-reducing device 220 identical in this embodiment to that from FIG. 3, which has its axially external end 222 mounted against the facing end of the end section 111b' of the male end fitting 111bis and its axially internal end 221 opening axially toward the interior of this section 111b'.

Figure 7:
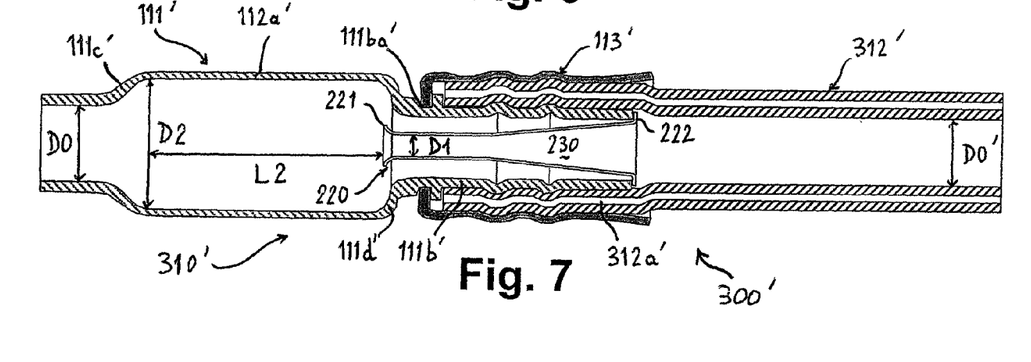
FIG. 7 is a view in longitudinal section of a duct in accordance with a second embodiment of the invention which differs from that of FIG. 6 only in the male end fitting used, the noise-reducing device being unchanged.

The duct 300' in accordance with the second embodiment of the invention that is shown in FIG. 7 (this figure is not drawn to scale either) differs from that from FIG. 6 only in the male end fitting 111' of its conduit 310' which, in contrast to the male end fitting 111bis from FIGS. 5 and 6, has axially beyond the female end 312' and the groove 111ba' receiving the crimping ring 113' a radially enlarged axial portion 112a'. It is seen in this FIG. 7 that the end section 111b' of the male end fitting 111' is virtually identical to that of the male end 111bis from FIGS. 5 and 6, but that this section 111b' is extended axially toward the interior of the male end fitting 111' by the enlarged portion 112a' in the form of a cylindrical acoustic capacity of inside diameter D2. This enlarged portion 112a' is itself extended at its two ends by respective convergent sections 111c' and 111d' of which that 111c' opposite the female end fitting 312' defines the nominal inside diameter D0 and the other 111d' is extended by this section 111b'.

There is shown in FIG. 7 the axial length L2 as measured between the axially internal end 221 of the device 220 and the opposite end of the enlarged portion 112a' extended by the convergent section 111c', it being pointed out that this internal end 221 of the device 220 opens axially into the interior of the enlarged portion 112a', which means that this portion 112a' has a total axial length greater than L2.

It will be noted that, in the manner of the first embodiment of the invention shown in FIG. 4, the enlarged portion 112a' of the male end fitting 111' is such that its length L2 as measured in this way is equal to or greater than 0.6 times the smaller of the aforementioned inside diameters D0 and D0', which produces an acoustic efficacy that is clearly improved relative to the duct 200' from FIG. 6 in particular.

Referring to FIG. 1, it will be noted that, as explained hereinabove, the device 220 is advantageously mounted, as much for the ducts 300 as 300':

either at an end of the conduit 6' of the low-pressure line 6, 6' that is connected to the compressor 2, so that the device 107 is mounted directly at the inlet of this compressor 2, or at an end of the conduit 8' of the high-pressure line 8, 8' that is connected to the compressor 2, so that the device 107 is mounted directly at the outlet of this compressor 2.

It will however be noted that these ducts 300, 300' in accordance with the invention may instead be mounted not only at an end of a low-pressure and/or high-pressure conduit 6', 8' but also elsewhere on these lines 6, 6' and/or 8, 8'.

The Applicant has carried out five acoustic tests T1, T2, I1, I2, I3 with the "control" ducts 100 and 200 from FIGS. 2, 3 ("control" tests T1 and T2) and with three ducts 300 from FIG. 4 (invention tests I1, I2, I3) differing from each other only in said length L2. The duct 300 used for each of these five tests had a nominal inside diameter D=D0=D0'=16.6 mm, a minimum inside diameter D1 of the device 220 equal to 8.0 mm and a maximum inside diameter D2 of the enlarged portion 312a equal to 20.65 mm. The tests I1, I2 and I3 employed three female end fittings 312 the enlarged portions whereof had values for said length L2 of 27 mm, 35 mm and 53 mm, respectively.

Figure 8:
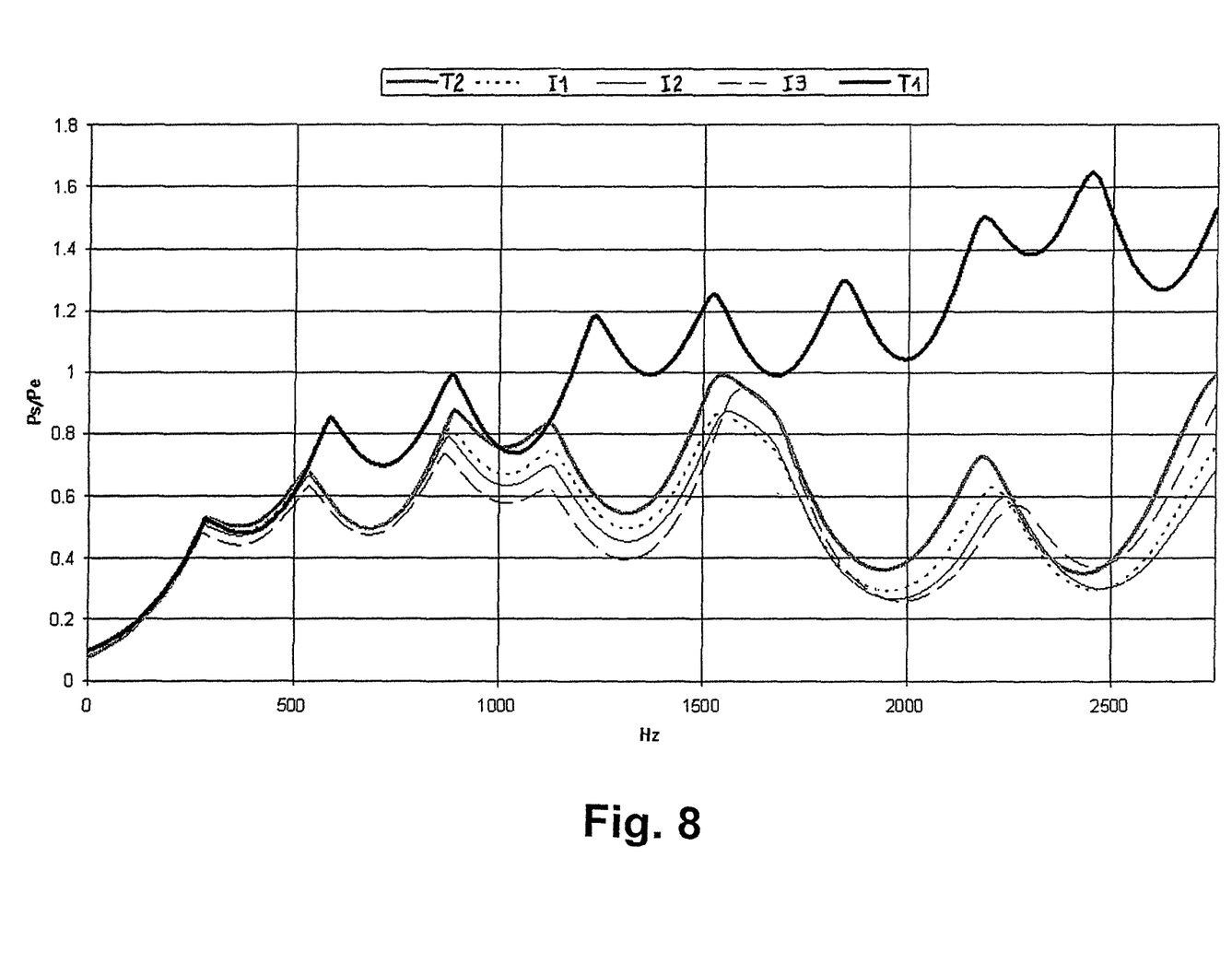
FIG. 8 is a graph showing, for five acoustic tests carried out with the "control" ducts from FIGS. 2, 3 and with three ducts in accordance with the invention from FIG. 4 differing from each other by said length L2, the evolution of the transfer function Ps/Pe (ratio between exit and entry acoustic pressures) as a function of the frequency (Hz)
Figure 9:
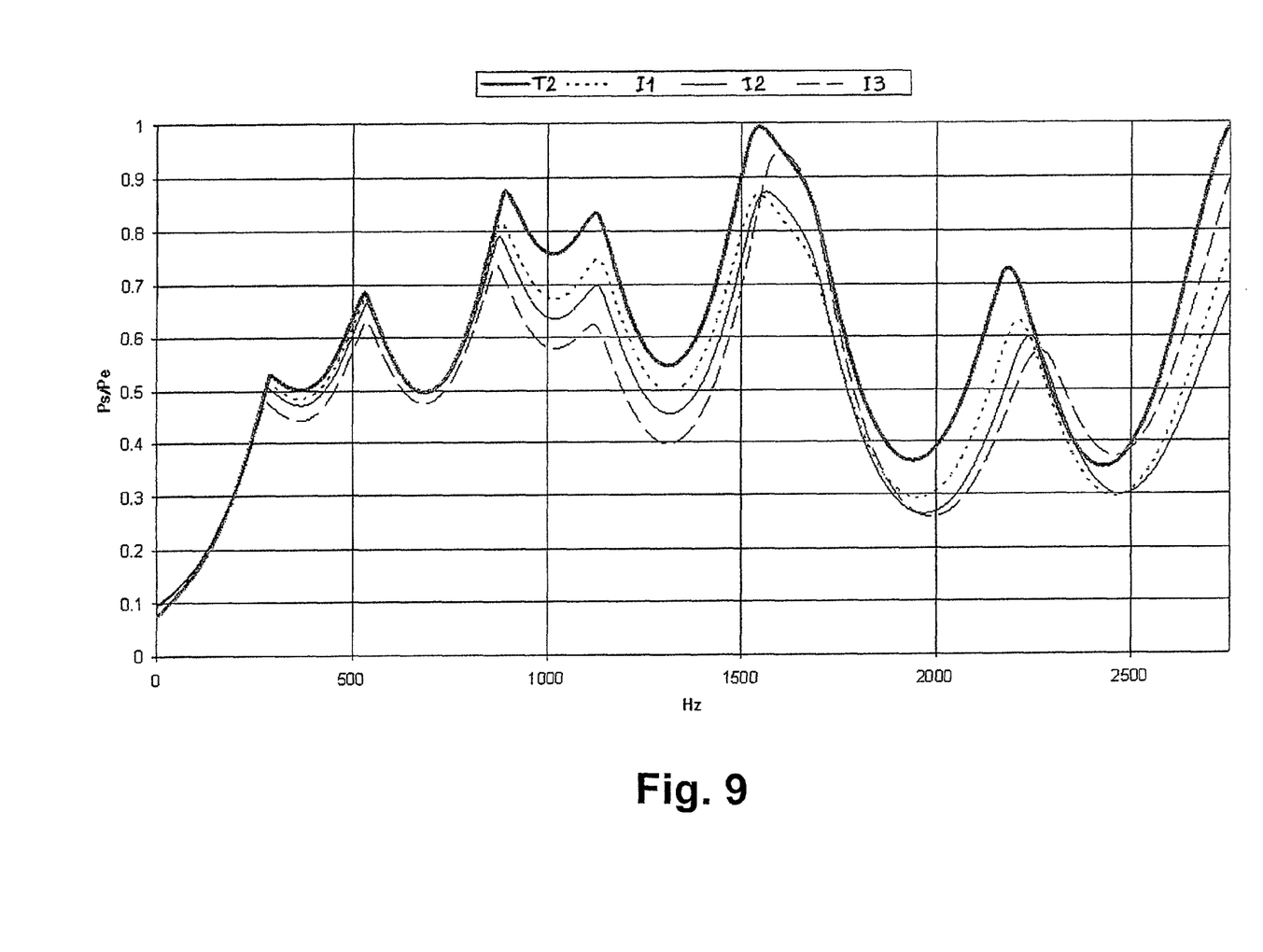
FIG. 9 is a graph corresponding to that of FIG. 5 but redrawn to a larger scale, showing the evolution of this transfer function for the "control" duct from FIG. 3 and these three ducts in accordance with the invention.

These static acoustic tests were carried out with air as the fluid under normal conditions of temperature (ambient temperature) and pressure (atmospheric pressure), it being pointed out that another gas would produce the same curves as those of FIGS. 8 and 9 simply with a geometrical similarity of the scale of the frequencies in the ratio of the speeds of the acoustic waves, by virtue of the volume compressibility of the gas.

The graph from FIG. 8 (these curves have been smoothed to make them more legible) shows that the acoustic transfer function Ps/Pe is very significantly reduced beyond a frequency of 500 Hz (which bears control to minimized acoustic transmission, and thus improved acoustic efficacy) for the invention tests I1, I2, I3 compared to the "control" test T1 with no noise-reducing device and with the prior art female end fitting 112, and that this transfer function is also significantly reduced from higher frequencies relative to the "control" test T2 with a noise-reducing device but again with this existing female end fitting 112.

To be more precise, and as can be seen even more clearly in the FIG. 9 graph, it is deduced from these curves I1 to I3 relative to T2 that the acoustic efficacy increases as said length L2 increases in the frequency band from 800 Hz to 1500 Hz, although it is pointed out that for frequencies greater than 1500 Hz (such as between 1600 Hz and 1750 Hz, for example, or even towards 2700 Hz), the test I3 with the largest value for L2 (53 mm) does not necessarily produce the best acoustic efficacy.

In the light of all the tests carried out, the Applicant has demonstrated an optimum range for said length L2 that is between about 1.5D and 2.4D inclusive, i.e. between about 25 mm and about 40 mm.

The invention claimed is:

1. A Duct for fluid under pressure of gas or supercritical type for an air-conditioning circuit of a motor vehicle or a building, the duct comprising:
    a conduit (including a tubular male end fitting of nominal inside diameter D0 and a tubular female end fitting that is connected in fluid-tight manner to the male end fitting in an enlarged axial portion of the female end fitting or in the immediate vicinity of an enlarged axial portion of the male end fitting, this male or female end fitting enlarged portion having a maximum inside diameter D2 and the female end fitting having a nominal inside diameter D0' identical to D0 or not, and
    a globally tubular noise-reducing device that is mounted axially and radially inside the male end fitting and defines, between an axially internal end and an axially external end of this device relative to the male end fitting at least one fluid flow channel in the direction of the axis (X) of the conduit, the external end of the device being mounted in fluid-tight manner against a terminal edge of the male end fitting in line with the female end fitting,
    wherein said enlarged portion of the male or female end fitting has, starting from said axially internal or external end of the device situated in line with this enlarged portion, a length L2 such that:
    L2≥0.6D, where D designates their common value if D0 and D0' are equal or whichever is the lower of the values D0 and D0' if they are not equal.

2. Duct according to claim 1, wherein said length L2 of said enlarged axial portion is such that L2≥10 mm.

3. Duct according to claim 1, wherein said length L2 of said enlarged axial portion is such that 1.5D≤L2≤2.4D.

4. Duct according to claim 3, wherein said length L2 of said enlarged axial portion is such that 25 mm≤L2≤40 mm.

5. Duct according to claim 1, wherein the female end fitting has a terminal connection area comprising said axial enlarged portion that has a globally cylindrical geometry of length greater than said length L2 for the fluid-tight mounting of a terminal section of this radially enlarged portion on an end section of the male end fitting via annular flanges surrounding these sections and included in the duct, this enlarged portion being extended opposite the male end fitting via a convergent connecting portion by another globally cylindrical portion having said nominal inside diameter D0'.

6. Duct according to claim 1, wherein the male end fitting has axially beyond the female end fitting said enlarged axial portion, which has a globally cylindrical geometry of length greater than said length L2, the female end fitting having a terminal connecting area mounted in a fluid-tight manner on an end section of the male end fitting situated short of this enlarged portion via an annular crimping member that surrounds this area and cooperates in abutment fashion with this end section in a fluid-tight manner, this enlarged portion being extended at its two ends by respective convergent portions of which that opposite the female end fitting defines said nominal inside diameter D0 and the other is extended by said end section.

7. Duct according to claim 1, wherein said axially external end of the noise-reducing device includes a radial flange mounted against an end enlargement of the male end fitting defining said terminal edge of the latter.

8. Duct according to claim 1, wherein the noise-reducing device delimits with the male end fitting axially between said axially internal end and said axially external end of the device, at least one annular dead volume that does not communicate with said channel via at least one of these two ends.

9. Duct according to claim 8, wherein said axially internal end of the device is also mounted in a fluid-tight manner against the male end fitting so that said annular dead volume extends from said internal end to said axially external end and does not communicate with said channel.

10. Duct according to claim 8, wherein said axially internal end of the device forms with the male end fitting at least one admission area for the fluid that is located radially between this axially internal end and the male end fitting and that communicates with said annular dead volume.

11. Duct according to claim 8, wherein the noise-reducing device has said axially internal end converging toward a substantially cylindrical or prismatic intermediate section of the device connected to said axially external end by a divergent downstream section.

12. Duct according to claim 1, wherein the noise-reducing device has an at least partly cylindrical external face that espouses the radial internal face of the male end fitting.

13. Air-conditioning circuit of a motor vehicle or a building, of the type including ducts intended to convey a cooling fluid in the gaseous state under pressure and at least one noise-reducing device inserted into at least one of said ducts, characterized in that said duct in which this device is inserted is as defined in claim 1.

14. Air-conditioning circuit according to claim 13 for a motor vehicle, wherein said or each duct in which said at least one device is inserted is connected directly to the inlet and/or the outlet of said compressor. respectively in a low-pressure line and/or in a high-pressure line of said circuit, said device being mounted at the end of said duct that opens onto said inlet and/or said outlet of the compressor, respectively in said low-pressure line and/or in said high-pressure line.

15. Air-conditioning circuit according to claim 14, wherein said duct in which said device is inserted is connected directly to the inlet of said compressor in a low-pressure line of said circuit.

* * * * *